United States Patent [19]
Ingrisch et al.

[11] Patent Number: 6,062,088
[45] Date of Patent: May 16, 2000

[54] PRESSURE SENSOR

[75] Inventors: Kurt Ingrisch, Reutlingen; Kurt Weiblen, Metzingen; Hubert Benzel, Pliezhausen, all of Germany; Botho Ziegenbein, Vienna, Austria; Hans-Peter Trah, Reutlingen, Germany; Andreas Duell, Stuttgart, Germany; Karl Bender, Tuebingen, Germany; Jochen Franz, Reutlingen, Germany

[73] Assignee: Robert Bosch GmbH, Stuttgart, Germany

[21] Appl. No.: 09/171,035

[22] PCT Filed: Apr. 9, 1997

[86] PCT No.: PCT/DE97/00716

§ 371 Date: Mar. 3, 1999

§ 102(e) Date: Mar. 3, 1999

[87] PCT Pub. No.: WO97/39320

PCT Pub. Date: Oct. 23, 1997

[30] Foreign Application Priority Data

Apr. 13, 1996 [DE] Germany .......................... 196 14 667

[51] Int. Cl.[7] .................................. G01L 9/06; G01L 7/06
[52] U.S. Cl. ................................................ 73/727; 73/721
[58] Field of Search .............................. 73/724, 725, 726, 73/727, 721, 756

[56] References Cited

U.S. PATENT DOCUMENTS 4,675,643  6/1987  Tanner et al. ................................ 338/4

FOREIGN PATENT DOCUMENTS

| 27 11 749 | 10/1977 | Germany . |
| 40 28 376 | 3/1992 | Germany . |
| 61-088121 | 5/1986 | Japan . |
| 06 188 120 | 7/1994 | Japan . |

Primary Examiner—William Oen
Assistant Examiner—Abdullahi Aw-Musse
Attorney, Agent, or Firm—Kenyon & Kenyon

[57] ABSTRACT

A pressure sensor includes a metallic membrane and a frame. For detecting the deflection of the membrane, a silicon bridge element having piezoresistive resistor elements is arranged on the membrane and the frame.

7 Claims, 2 Drawing Sheets

PRESSURE SENSOR

FIELD OF THE INVENTION

The present invention relates to a pressure sensor.

BACKGROUND INFORMATION

German Patent 40 28 376 describes a conventional pressure sensor, in which a strain element (i.e., expansion measuring element) is applied on a membrane. The strain element is produced on a glass plate using thin-layer technology.

SUMMARY OF THE INVENTION

In contrast, the pressure sensor according to the present invention has the advantage that, by using silicon bridge elements, particularly inexpensive pressure sensors can be produced. Individual bridge elements can be manufactured very cost-effectively by producing a multiplicity of bridge elements simultaneously from one silicon wafer. In this context, the mounted piezoresistive resistor elements exhibit high sensitivity.

By setting the membrane in a rigid frame, as one piece, a pressure sensor is produced in which by simply varying the membrane thickness, sensors can be manufactured for various pressure ranges. In this context, to achieve high sensitivity, the strain element extends from the frame onto the membrane. The piezoelectric resistor elements are preferably arranged in areas of great mechanical deformation, in order to assure a high measured signal. The silicon bridge element can be arranged either directly on the metal membrane and the frame or via a substrate. By using the substrate, the silicon bridge element is easier to handle during the manufacturing process. In this context, provision can be made for a joining area on the frame and on the membrane. To improve the temperature sensitivity of the sensor signal, provision can be made that the joining area not be fixedly joined to the membrane, but rather rest on it. The attachment areas are preferably joined to the membrane or to the frame by gluing or soldering. Membranes and frames can advantageously be manufactured by a metal machining process. To make possible a particularly simple assembly of the pressure sensor, the frame can also be designed as a screw-in part which is provided with a thread.

DETAILED DESCRIPTION

Figure 1:
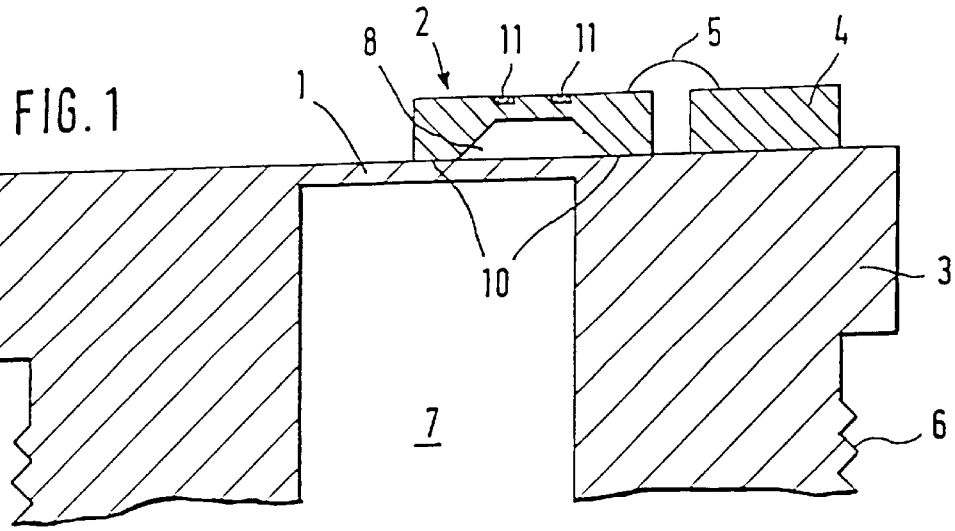
FIG. 1 shows a first exemplary embodiment of a pressure sensor according to the present invention.

FIG. 1 shows a first exemplary embodiment of the pressure sensor according to the invention having a metallic membrane 1, which is set (i.e., stretched on) in a rigid frame 3. Arranged on membrane 1 is a strain element, which is configured as a silicon bridge element 2. Silicon bridge element 2 is attached; on the one hand, to membrane 1, and on the other hand, to rigid frame 3, in each case via a joining area 10. Furthermore, provision is made on rigid frame 3 for a hybrid circuit 4, by means of which the signals of silicon bridge element 2 are evaluated. For this purpose, silicon bridge element 2 has piezoresistive resistors 11, whose resistance changes as a function of the stress states in the silicon material. The electrical connection between silicon bridge element 2 and hybrid circuit 4 is brought about via a bonding wire 5. Moreover, provision can be made for further bonding wires or other electrical conducting elements, by means of which the signals of hybrid circuit 4 can be routed to beyond the pressure sensor. Frame 3 additionally has a thread 6, by means of which frame 3 can be fixedly mounted.

Via pressure feed 7, the lower side of membrane 1 is acted upon by a pressure to be measured. The upper side of the membrane is acted upon by the normal pressure of the environment or by a reference pressure, so that the absolute pressure or a differential pressure is measured. Due to the pressure difference between pressure feed 7 and the upper side of the membrane, a deformation of the membrane occurs, which causes a corresponding deformation of silicon bridge element 2. Silicon bridge element 2 has a cutout 8, by which is created a weakened bridge area, i.e., of a thinner configuration. Particularly great mechanical stresses arise in this bridge area. For this reason, in this area, i.e., above cutout 8, piezoresistive resistors 11 are also arranged. The latter change their resistance value as a function of mechanical stresses. These changes in resistance are detected by hybrid circuit 4 and are a measure for the pressure being exerted in pressure feed 7.

Figure 2:
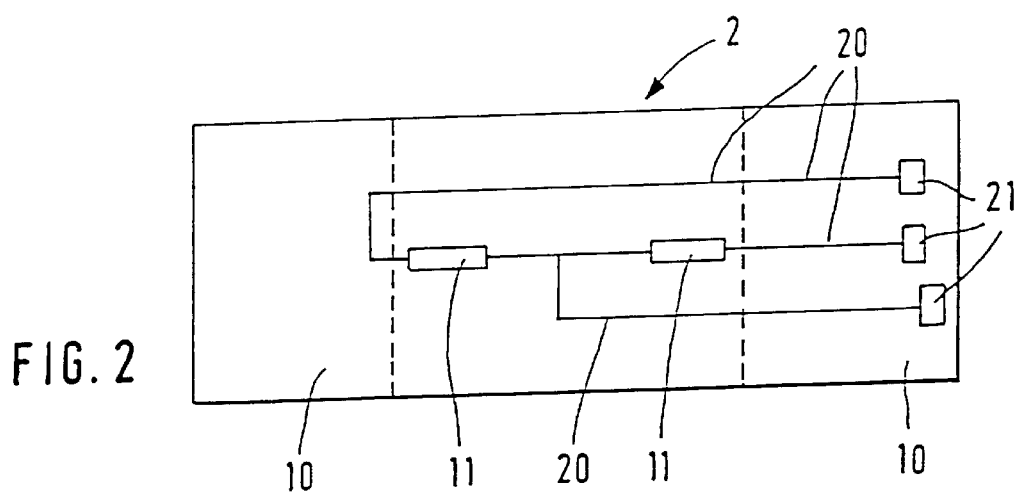
FIG. 2 shows a top view of a silicon bridge element according to the present invention.

FIG. 2 shows, as an example, a top view of a silicon bridge 2 according to FIG. 1. In this context, piezoresistive resistors 11 are arranged so that great mechanical stresses occur in them when silicon bridge 2 is deformed by the deflection of membrane 1. In the present case, provision is therefore made that resistor elements 11 not be arranged over joining areas 10. For the purpose of contacting piezoelectric resistors 11, printed circuit traces 20 are provided which lead to terminal areas 21. Bonding wires 5, shown in FIG. 1, can be attached to terminal areas 21. Printed circuit traces 20 produce an electrical contact to piezoelectric resistors 11. In FIG. 2, two resistors 11 are shown which are interconnected in the manner of a half-bridge. However, other arrangements of resistor elements 11 are also conceivable; in particular, provision may be made for more resistor elements, for example, in the form of a full bridge. Furthermore, provision can also be made for further resistor elements, whose resistance value is independent of a deformation of membrane 1, in the areas in which small mechanical stresses arise, for example in the areas which are positioned over joining areas 10. Resistor elements of this type can be used as reference resistor elements. Resistor elements 11 are produced by diffusing impurities into the silicon of silicon bridge 2. In this context, by means of a corresponding doping and orientation in accordance with certain crystal axes, the resistor can be made to greatly reflect mechanical stresses. Printed circuit traces 20 can be realized through surface metal layers or through diffusion processes, the doping, in this context, having to be set very high so that the piezoresistive effect is slight. Cutout 8, depicted in FIG. 1, can be produced particularly simply by means of an anisotropic etching process of the monocrystalline material of silicon bridge element 2. In manufacturing silicon bridge element 2, the first choice is parallel manufacturing, i.e., assuming a monocrystalline silicon wafer, a multiplicity of bridge elements is produced in parallel (i.e., simultaneously). By separating the silicon wafer into parts at the end of the manufacturing process, a multiplicity of individual bridge elements can then be produced. The advantage of this way of proceeding is that the manufacturing costs for the individual silicon bridge element are particularly small, and that manufacturing processes of this type can be carried out with great precision. In this way, highly precise but inexpensive bridge elements are produced.

Membrane 1 and frame 3 can be advantageously produced on the basis of a one-piece design made possible by a machining process, for example, by machine cutting from a metal blank. However, other procedures are also conceivable by means of which a metallic frame 3 and a membrane 1, joined thereto in one piece, can be simultaneously produced. Through simple variation of the thickness and the diameter of membrane 1, the sensitivity of the pressure sensor can be set across a wide range of sensitivity during the manufacturing process. In this way it is also possible to manufacture pressure sensors for various pressure ranges without varying silicon bridge element 2. Furthermore, during manufacturing, frame 3 can immediately be provided with a thread 6. By means of a thread 6 of this type, frame 3 can be screwed, pressure-tight, to a housing, measuring body, or the like. The pressure sensor can thus in a simple manner be configured as a screw-in element. Sensors manufactured in this way may be used to particular advantage as high-pressure sensors having a range of several thousand bar.

Figure 3:
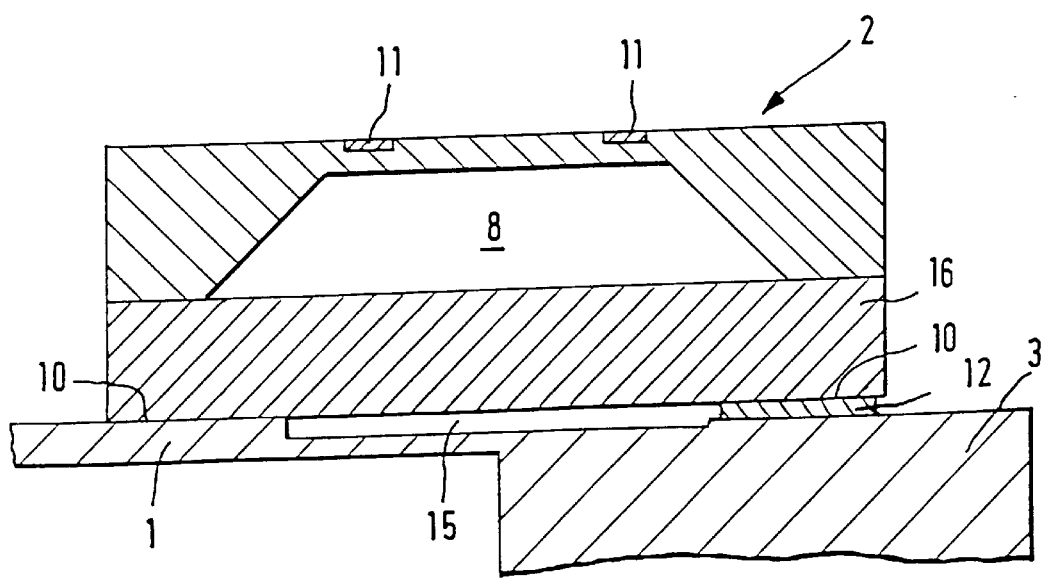
FIG. 3 shows another exemplary embodiment of the pressure sensor according to the present invention.

FIG. 3 shows a further exemplary embodiment of the present invention. Silicon bridge element 2 corresponds to bridge element 2, which is already known from FIG. 1. However, bridge element 2 here is not mounted directly on membrane 1 and frame 3, but rather is joined to the latter only via a substrate 16. In one joining area 10, substrate 16 is fixedly joined to frame 3 via an attachment layer 12. Above membrane 1, substrate 16 has only one joining area 10, at which substrate 16 rests on membrane 1. Silicon bridge element 2 is fixedly joined to substrate 16. In order to assure that, during the manufacturing process of the pressure sensor, attaching means 12, which, for example, is configured as solder, only creates a fixed connection on the frame, provision is made for a solder pad 15 which limits the spreading of attaching means 12 in the direction of membrane 1. Solder pad 15 is configured here as a cutout (i.e., recess). However, all other measures are also conceivable, which prevent attaching means 12 from spreading in the direction of membrane 1.

The manufacture of silicon bridge elements 2 is made simpler through the use of substrate 16. In this context, it should be noted that as a result of cutout 8, bridge element 2 is very delicate mechanically and could be destroyed while being mounted on membrane 1 or frame 3. For example, in a parallel manufacturing process, substrate 16, complete, as a large-surface disk, can initially also be joined to the silicon wafer and then, together with the silicon wafer, be separated into individual small areas. The strain elements, produced in this way, in which the sensitive silicon bridge elements 2 are arranged, in each case, on a substrate 16, are also significantly easier to handle in the manufacturing process than silicon bridge elements 2 by themselves. Furthermore, for substrate 16, a material can be used which, to a certain extent, compensates for the differing thermal expansion coefficients of silicon and metal. For this purpose, glass, for example, is suitable as a material for substrate 16. The use of substrate 16 is also advantageous when substrate 16 is joined both to frame 3 and to membrane 1.

Substrate 16, depicted in FIG. 3 is fixedly joined only to frame 3, whereas it merely rests on membrane 1. Thus a fixed base is formed on frame 3 and a non-fixed base is formed on membrane 1. Substrate 16 and silicon bridge element 2, joined thereto, can thus contract or expand vis-à-vis the metallic material of membrane 1 and frame 3, without noticeable mechanical stresses rising in the process. A deflection of membrane 1, generated by pressure acting on the pressure sensor, nevertheless leads as before to mechanical stresses in silicon bridge element 2, which can be detected by piezoelectric resistors 11. Through the use of a non-fixed and fixed base, the thermal sensitivity of the pressure sensor is reduced without this being associated with a significant reduction in the sensitivity (i.e., pressure).

Figure 4:
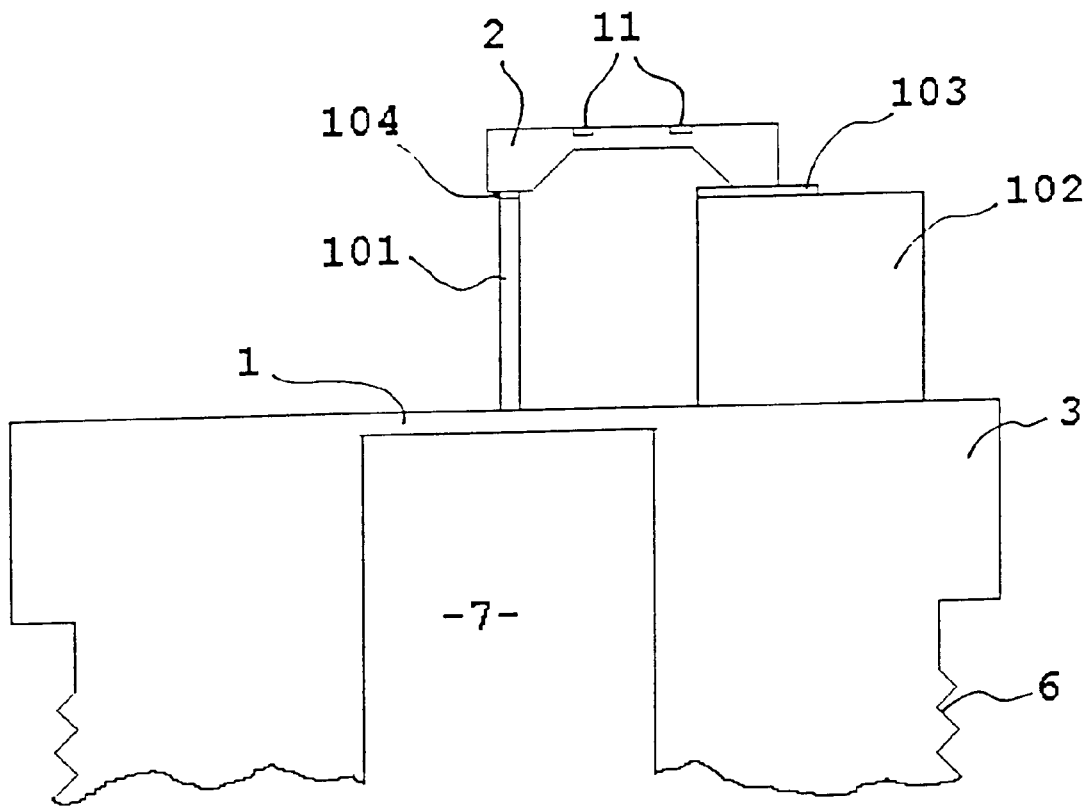
FIG. 4 shows yet another exemplary embodiment of the pressure sensor according to the present invention.

FIG. 4 shows a further exemplary embodiment of the pressure sensor according to the present invention. Silicon bridge element 2, metallic membrane 1 and frame 3 correspond to the elements from FIG. 1 or 3. As in FIG. 3, silicon bridge element 2 is here not directly joined to metallic membrane 1 or frame 3. Silicon bridge element 2 is joined to frame 3 via a pedestal 102. Silicon bridge element 2 is joined to membrane 1 via a support 101. Between support 101, pedestal 102, and silicon bridge element 2, provision is made for a connecting layer 103 and 104, respectively.

For support 101 and pedestal 102, a material is used whose thermal expansion coefficient is accommodated to silicon. The temperature-dependent expansion of the iron-nickel metal, in this context, should be as close to the thermal expansion coefficient of silicon as possible. In addition, nickel-iron metal is used for a support 101 and a pedestal 102. For connecting layers 103, 104, a solder glass is preferably used, whose expansion coefficient is also accommodated to silicon.

The deflection of metallic membrane 1 is transmitted to silicon bridge element 2 via support 101. Pedestal 102 acts as the fixed attachment of silicon bridge element 2 on rigid frame 3. As a result of the accommodated temperature coefficients, thermally-caused stresses in silicon bridge element 2 can be reduced. In this context, the thermal expansion in the X direction is important because metallic membrane 1 and frame 3 are preferably made of steel, and this material exhibits a very different expansion coefficient in comparison to the silicon material of silicon bridge element 2. As a result of the rigid design of support 101 in the Y direction, small deflections of metallic membrane 1 in the Y direction are transmitted effectively to silicon bridge element 2. Support 101, however, in the X direction is configured as very narrow, so that if a different expansion of frame 3 and metallic membrane 1 should arise, an expansion in the X direction by support 101 is compensated for by a bending of support 101. Thus it is achieved that the force created by a temperature influence essentially depends only on the geometric form and elasticity module of the material of the support. Furthermore, through the choice of a suitable glass solder for the connecting layer 103, 104, the thermal influence on the silicon bridge element can be further reduced.

For the joining of support 101 to membrane 1 or of pedestal 102 to frame 3, the conventional metal connections are appropriate, such as welding, soldering or gluing.

What is claimed is:

1. A pressure sensor, comprising:
   a metallic membrane;
   a strain element including a silicon bridge element, piezoresistive resistor elements being situated on the silicon bridge element, the silicon bridge element being coupled to the metallic membrane via a support, the support being rigid in a first direction normal to the metallic membrane and flexible in a second direction parallel to the metallic membrane; and
   a stiff frame coupled to the silicon bridge element via a pedestal, the support and the pedestal being composed of a material, a first thermal expansion coefficient of the material substantially corresponding to a second thermal expansion coefficient of silicon.

2. The pressure sensor according to claim 1, wherein the material includes a nickel-iron metal.

3. The pressure sensor according to claim 1, wherein the metallic membrane and the stiff frame are configured as a single piece.

4. The pressure sensor according to claim 1, wherein the metallic membrane and the stiff frame are manufactured using a machining procedure.

5. The pressure sensor according to claim 1, wherein the stiff frame includes a thread.

6. The pressure sensor according to claim 1, wherein the support and the pedestal are coupled to the silicon bridge element via connecting layers, the connecting layers being composed of a glass solder material.

7. The pressure sensor according to claim 1, wherein the support and the pedestal are coupled to the metallic membrane and the stiff frame using one of a welding procedure, a soldering procedure and a gluing procedure.

* * * * *